(12) United States Patent
Tripp

(10) Patent No.: US 11,905,105 B2
(45) Date of Patent: Feb. 20, 2024

(54) SHIPPING AND STOCKING CONTAINER

(71) Applicant: Target Brands, Inc., Minneapolis, MN (US)

(72) Inventor: Michael Tripp, St. Anthony, MN (US)

(73) Assignee: Target Brands, Inc., Minneapolis, MN (US)

( * ) Notice: Subject to any disclaimer, the term of this patent is extended or adjusted under 35 U.S.C. 154(b) by 13 days.

(21) Appl. No.: 17/838,153

(22) Filed: Jun. 10, 2022

(65) Prior Publication Data

US 2022/0396420 A1 Dec. 15, 2022

Related U.S. Application Data

(60) Provisional application No. 63/210,223, filed on Jun. 14, 2021.

(51) Int. Cl.
| | |
|---|---|
| *B65D 88/12* | (2006.01) |
| *B65D 88/02* | (2006.01) |
| *B65D 90/00* | (2006.01) |
| *B65D 90/18* | (2006.01) |

(52) U.S. Cl.
CPC ......... *B65D 88/126* (2013.01); *B65D 88/022* (2013.01); *B65D 90/0033* (2013.01); *B65D 90/18* (2013.01)

(58) Field of Classification Search
CPC ................ B65D 88/126; B65D 88/022; B65D 90/0033; B65D 90/18; B65D 25/005; B65D 2209/00; B65D 2519/00641; B65D 2519/00711; B65D 2519/00781; B65D 2519/00791; B65D 2519/00796; B65D 2519/00805; B65D 2519/00975;
(Continued)

(56) References Cited

U.S. PATENT DOCUMENTS

| | | | | |
|---|---|---|---|---|
| 3,680,477 | A * | 8/1972 | Glanz | ................... B30B 9/3042 100/220 |
| 3,749,414 | A * | 7/1973 | Lynn | ....................... B62B 1/264 211/83 |

(Continued)

FOREIGN PATENT DOCUMENTS

| | | |
|---|---|---|
| DE | 196 31 709 A1 | 2/1998 |
| DE | 197 41 311 A1 | 4/1999 |

(Continued)

OTHER PUBLICATIONS

Extended European Search Report for Application No. 22179059.5 dated Jan. 31, 2023.

*Primary Examiner* — Kareen K Thomas
(74) *Attorney, Agent, or Firm* — Merchant & Gould P.C.

(57) ABSTRACT

A shipping container is configured to transport goods from a distribution center, to a retail location, and onto the sales floor of the retail location. The shipping container glides on wheels and is stackable. The shipping container is configured to receive forklift forks from multiple sides. At least one of the channels includes a surrounding framework to safeguard against tilting. The lid is selectively mountable in two orientations to close the container or to provide handles for propelling and/or steering the shipping container. An expandable storage location for empty packaging is provided at an exterior of the shipping container.

20 Claims, 8 Drawing Sheets

(58) Field of Classification Search
CPC .......... B65D 19/42; B65D 19/06; B62B 3/16; B62B 3/008; B62B 2203/28
See application file for complete search history.

(56) References Cited

U.S. PATENT DOCUMENTS

| | | | | | |
|---|---|---|---|---|---|
| 3,830,514 | A | * | 8/1974 | Green | B65F 1/1623 248/129 |
| 3,896,520 | A | * | 7/1975 | Williams | A47L 11/4088 15/353 |
| 3,960,252 | A | * | 6/1976 | Cassimally | A45C 5/146 280/37 |
| 3,966,072 | A | * | 6/1976 | Gonzales | B65D 19/12 220/7 |
| 4,313,612 | A | * | 2/1982 | Rubens | B62B 3/04 280/47.35 |
| 5,015,143 | A | * | 5/1991 | Carson | B65F 3/001 220/909 |
| 5,482,605 | A | * | 1/1996 | Taylor | C25D 17/00 204/229.4 |
| 8,699,235 | B2 | * | 4/2014 | Soufan | H04M 1/19 361/818 |
| 2008/0210260 | A1 | * | 9/2008 | Porter | B08B 3/006 134/57 R |
| 2009/0021654 | A1 | * | 1/2009 | Jones | A45C 15/00 348/836 |
| 2009/0097957 | A1 | | 4/2009 | Cramer et al. | |
| 2015/0159404 | A1 | * | 6/2015 | Treadwell | E05B 15/0093 220/326 |

FOREIGN PATENT DOCUMENTS

| | | |
|---|---|---|
| DE | 203 04 845 U1 | 5/2003 |
| EP | 0 277 844 A1 | 8/1988 |
| EP | 2 256 050 A1 | 12/2010 |
| EP | 3 501 941 A1 | 6/2019 |
| WO | 00/30946 A1 | 6/2000 |

\* cited by examiner

SHIPPING AND STOCKING CONTAINER

CROSS-REFERENCE TO RELATED APPLICATIONS

This application claims the benefit of U.S. Provisional Patent Application No. 63/210,223, filed Jun. 14, 2021. The disclosure of the priority application in its entirety is hereby incorporated by reference into the presence application.

BACKGROUND

Retail providers ship items in bulk from distribution centers to various retail establishments. For example, large quantities of items may be packed onto a truck, ship, or other vehicle using pallets or intermodal containers; transported to a retail location; unpacked from the vehicle; and loaded onto a dolly for transport to the shelves of the retail location. Loading, unloading, and reloading of the items is labor intensive and time consuming. Improvements are desired.

SUMMARY

Some aspects of the disclosure are directed a shipping container that is sufficiently large and stable to hold a plurality of items securely when loaded on a transport vehicle while also being sufficiently small and maneuverable to reach the shelves of a retail establishment.

In certain implementations, the shipping container includes a base, a peripheral wall that mounts to the base to define an interior; and a lid that mounts to the peripheral wall to close the interior. The base includes caster wheels. The lid is removable from the peripheral wall.

In certain implementations, the base defines channels along which forks of a fork lift can extend to lift and carry the shipping container. In certain examples, the channels include two channels extending along a depth of the shipping container and a single channel extending along the width of the shipping container. The single channel is wider than either of the two channels.

In certain implementations, a framework is mounted along the single channel to provide support at spaced intervals along the single channel. At each of the spaced intervals, the framework surrounds a transverse cross-section of the single channel. The framework provides an anti-tilt safeguard when the shipping container is carried by a forklift or other such vehicle using the single channel.

In certain implementations, the lid of the shipping container defines depressions at which caster wheels of the base fit. Accordingly, a plurality of like shipping containers can be stacked together. In certain examples, the outer caster wheels are configured to swivel and the corresponding outer depressions are configured to receive the respective caster wheels at any orientation along the swivel path. In certain examples, at least one of the caster wheels is stationary and the corresponding depression is configured to receive the at least one caster wheel at a fixed orientation.

In certain implementations, the lid of the shipping container is configured to mount to the peripheral wall in a first orientation to close the interior of the shipping container and in a second orientation that is different from the first orientation. In certain examples, the lid securely attaches to a remainder of the shipping container (e.g., to the peripheral wall and/or to the base) so that the lid may be used to control propulsion and steering of the shipping container. For example, the lid may include steering handles by which a user may grasp and manipulate the shipping container when the lid is mounted in the second orientation. The lid may also include separate handles to facilitate mounting and unmounting the lid in the first orientation.

In certain implementations, the shipping container includes a storage arrangement disposed at an exterior of the peripheral wall. The storage arrangement has an expandable/contractible volume in which packaging for the items may be stored as the items are unloaded from the shipping container.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
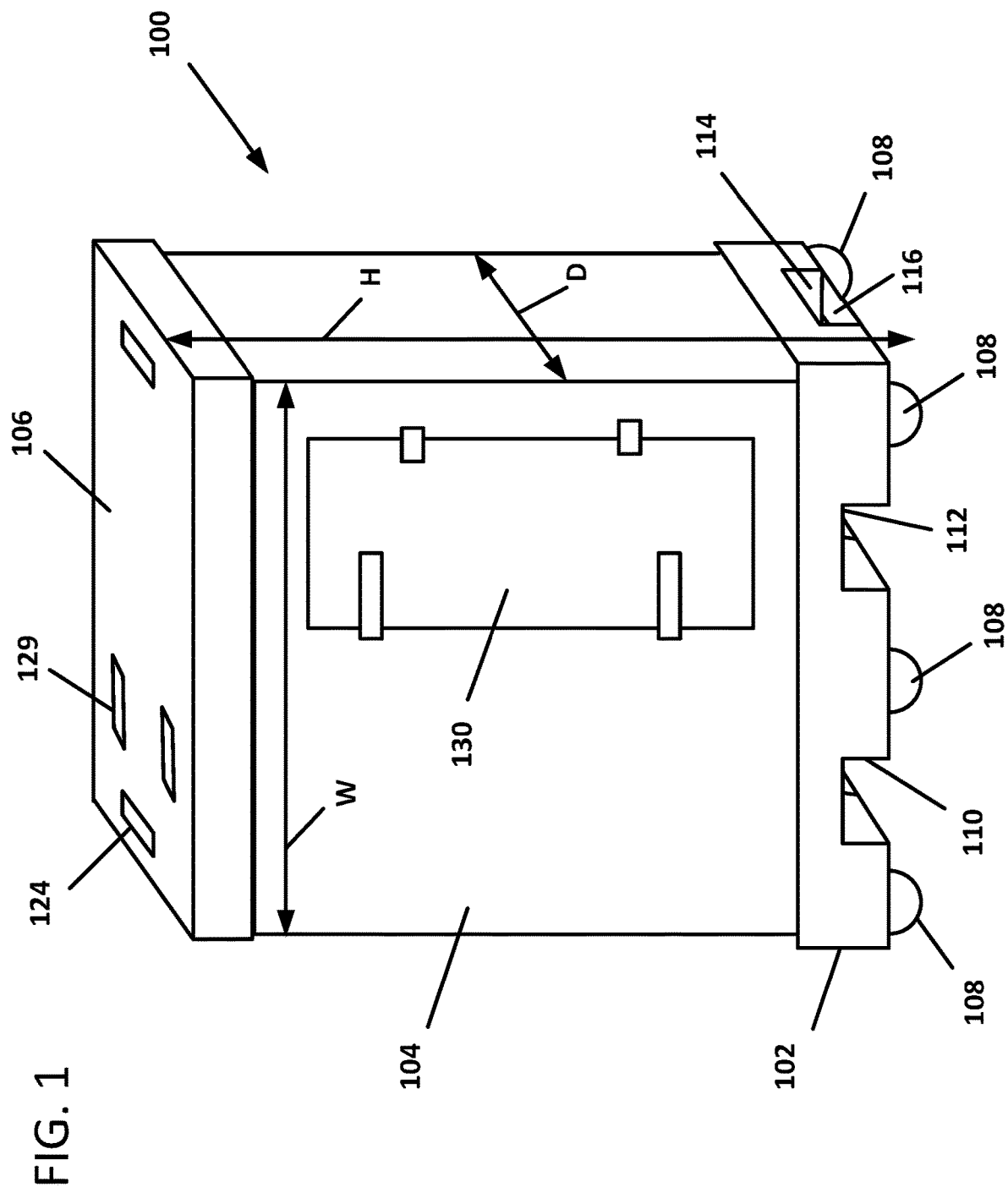
FIG. 1 is a perspective view of an example shipping container configured in accordance with the principles of the present disclosure, the shipping container including a lid mounted to a peripheral wall in a first orientation.

FIG. 1 illustrates an example implementation of a shipping container 100 configured in accordance with the principles of the present disclosure. The shipping container 100 extends along a height H, a width W, and a depth D that are transverse to each other. In certain examples, the height H is larger than the width W, which is larger than the depth D. The shipping container 100 includes a base 102, a peripheral wall 104, and a lid 106. The lid 106 is removable from the peripheral wall 104 to expose an interior of the shipping container 100. In certain examples, the peripheral wall 104 includes a door covering an access aperture through the peripheral wall by which a user also may access the interior of the shipping container 100.

In certain implementations, the height H is about 30-70 inches, the width W is about 25-65 inches, and the depth D is about 15-40 inches. In certain examples, the height H is about 40-60 inches. In certain examples, the width W is about 35-55 inches. In certain examples, the depth D is about 20-30 inches. In an example, the height H is about 50 inches, the width W is about 48 inches, and the depth D is about 24 inches. In certain implementations, the shipping container 100 defines an interior having a load volume of 20-30 cubic feet. In certain examples, the load volume of the shipping container 100 is about 15-25 cubic feet. In certain examples, the load volume of the shipping container 100 is about 25-35 cubic feet. In certain examples, the load volume of the shipping container 100 is about 22-28 cubic feet. In certain examples, the load volume of the shipping container 100 is about 24-25 cubic feet.

The base 102 includes caster wheels 108 to facilitate transport of the shipping container along a surface. In certain implementations, at least some of the caster wheels are swivel wheels that can rotate to facilitate turning of the shipping container. In certain examples, at least the caster wheels 108 disposed at the corners of the base 102 are swivel wheels. In certain examples, caster wheels 108 disposed at central locations along the width W of the shipping container 100 may be stationary (i.e., not configured to swivel). Such a configuration enables the shipping container 100 to have a zero degree turn radius.

The base 102 defines an upper surface at which the peripheral wall 104 mounts and a lower surface at which fork lift channels 110, 112, 114 are defined. In certain examples, the base 102 defines two channels 110, 112 extending along the depth D of the shipping container 100. Each of the two channels 110, 112 extends between opposite open ends. The open ends of the two channels 110, 112 are spaced from each other along the width W of the shipping container. In certain examples, the base 102 also defines a third channel 114 that extends along the width of the shipping container 100. In certain examples, the third channel 114 is the only forklift channel that extends along the width W. The third channel 114 intersects the two channels 110, 112 extending along the depth D.

In certain implementations, the third channel 114 is wider than the first and second channels 110, 112. In certain examples, the two channels 110, 112 are each sized to receive only a single fork of a forklift while the third channel 114 is sized to receive two forks of the forklift. In certain implementations, the two channels 110, 112 define fully open bottom sides extending between the opposite open ends of the channels 110, 112.

Figure 2:
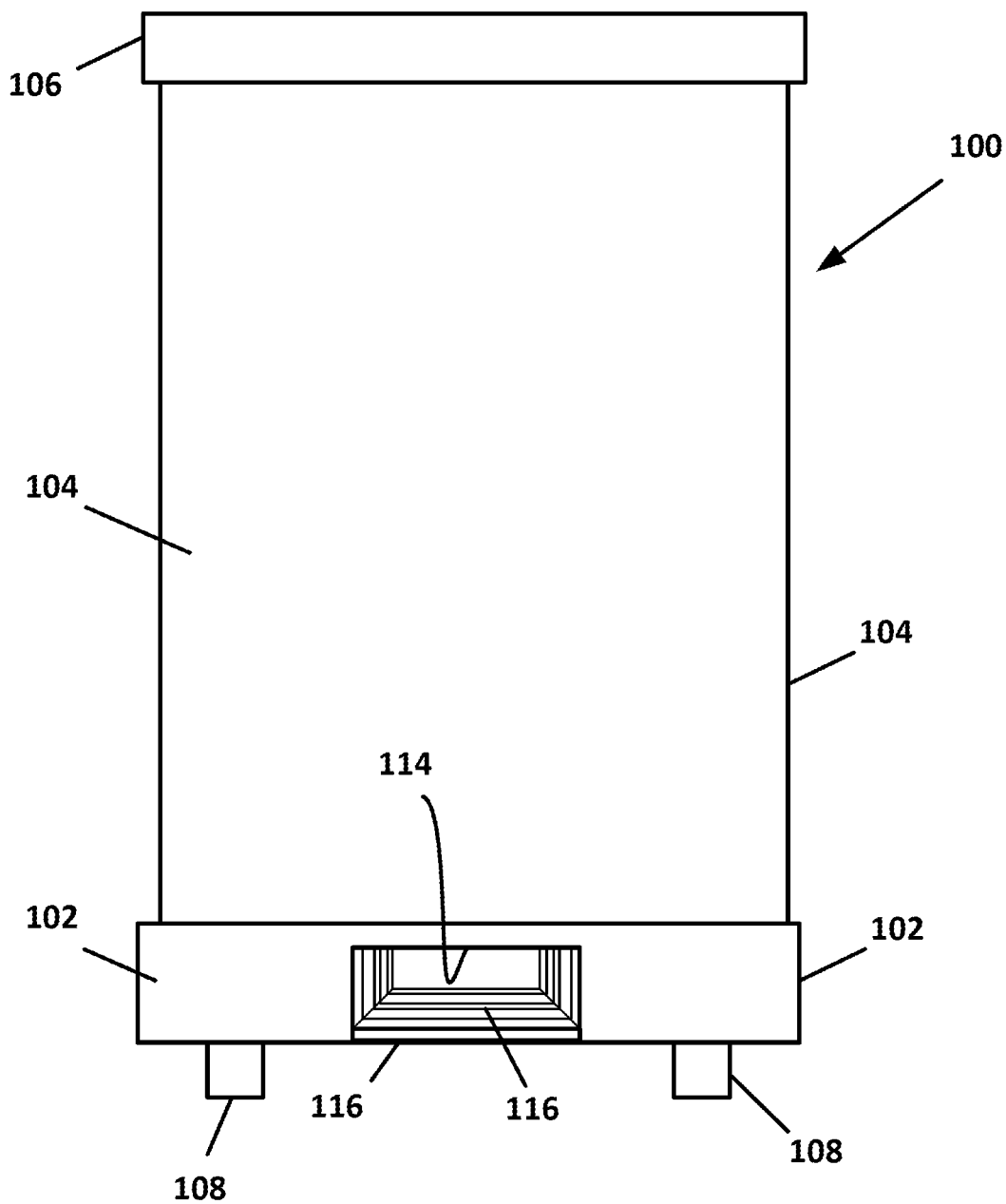
FIG. 2 is a first end elevational view of the shipping container of FIG. 1.

In certain implementations, a framework 116 is disposed along the third channel 114. In certain examples, the framework 116 is configured to inhibit tilting of the shipping container 100 when the shipping container 100 is balanced on forks extending through the third channel 114. For example, the framework 116 includes strips that extend across the bottom side of the third channel 114 at spaced intervals along the third channel 114 (e.g., see FIG. 2). In certain examples, the framework includes U-shaped cross-members that extend down from the base at sides of the third channel 114 and extend transversely across the third channel 114. In certain examples, the framework 116 is formed of metal.

Figure 3:
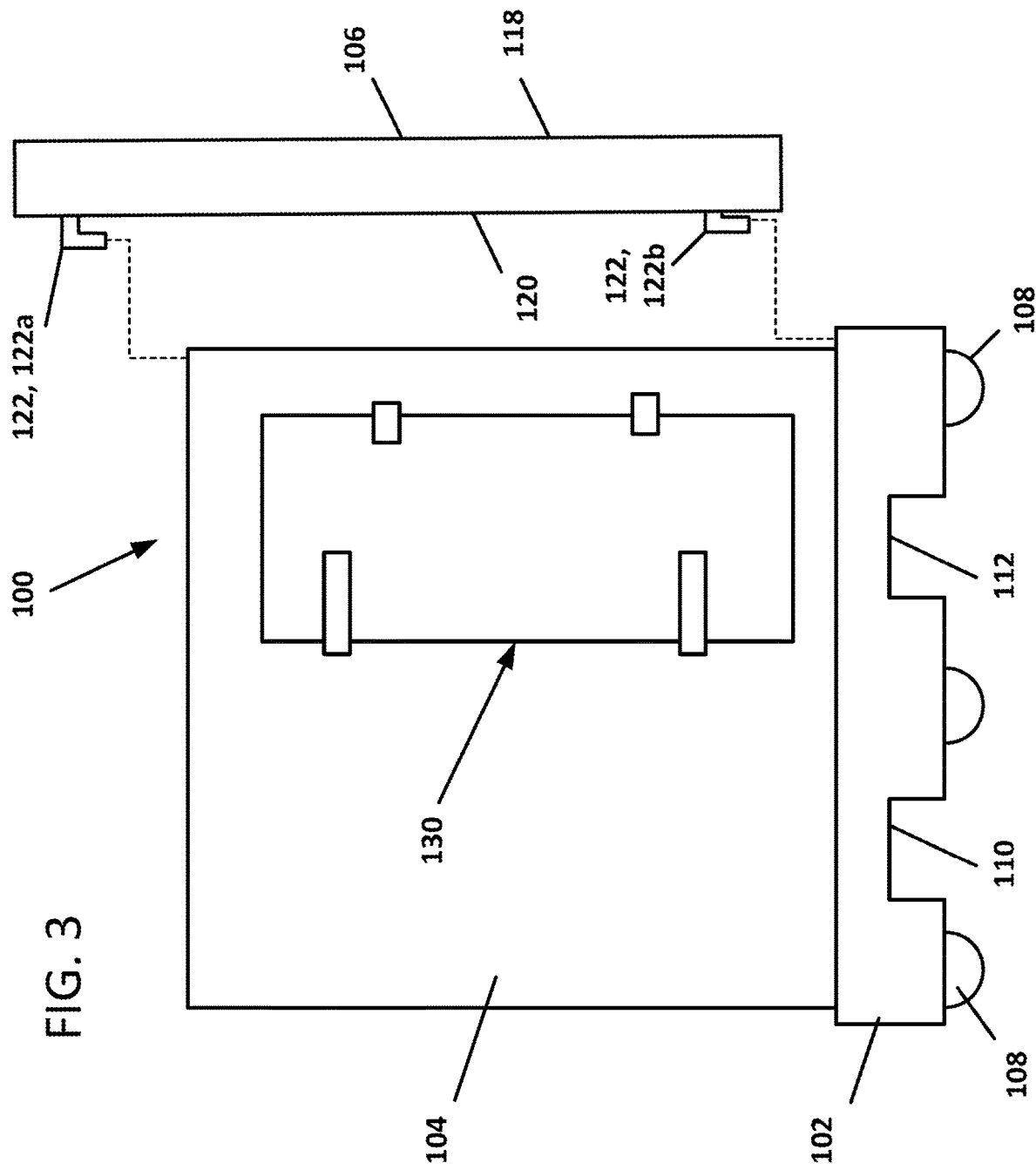
FIG. 3 is a first side elevational view of the shipping container of FIG. 1 with the lid shown in a second orientation and exploded from the peripheral wall.

In certain implementations, the lid 106 is configured to mount to the peripheral wall 104 in a first orientation (e.g., see FIG. 1) to close the interior of the shipping container and in a second orientation (e.g., see FIGS. 3 and 4) to provide propulsion and steering control for the shipping container 100. In certain examples, the lid 106 is elongate along the width W of the shipping container 100 when disposed in the first orientation and is elongate along the height H of the shipping container 100 when disposed in the second orientation. The lid 106 is larger than a transverse cross-sectional area of the peripheral wall. Accordingly, the lid 106 seats on the peripheral wall 104 in the first orientation. The lid 106 has an outer side 118 facing outwardly from the shipping container 100 and an inner side 120 facing the interior of the shipping container 100 when the lid 106 is disposed in the first orientation.

In certain implementations, multiple attachment members 122 (e.g., hooks, latches, etc.) are mounted to the inner side 120 of the lid 106. The attachment members 122 do not engage the peripheral wall 104 when the lid 106 is mounted in the first orientation. The attachment members 122 engage at least the peripheral wall 104 when the lid 106 is mounted in the second orientation. In certain examples, a first 122a of the attachment members 122 engages the peripheral wall 106 and a second 122b of the attachment members 122 engages the base 102 (e.g., see FIG. 3). In certain examples, the first attachment member 122a is spaced along the height H of the shipping container from the second attachment member 122b when the lid 106 is mounted in the second orientation.

Figure 4:
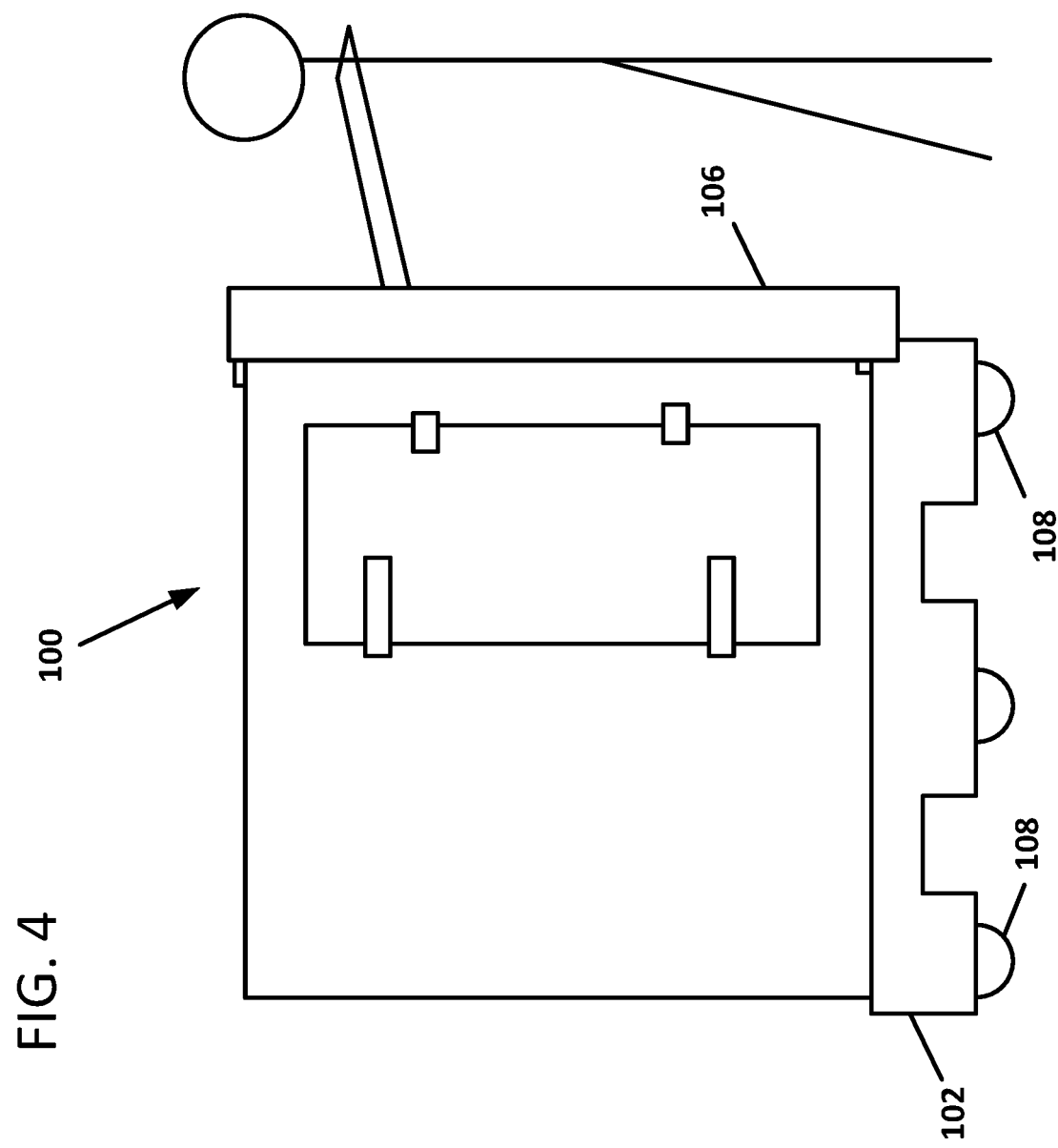
FIG. 4 illustrates a user propelling the shipping container using the lid when the lid is attached in the second orientation.

In certain examples, the attachment members 122 secure the lid 106 to a remainder of the shipping container 100 with a positive lock to inhibit accidental detachment of the lid 106. In certain implementations, the attachment members 122 secure the lid 106 to the remainder of the shipping container 100 sufficiently securement to maneuver the shipping container 100 using the lid 106. For example, as shown in FIG. 4, a user may grasp the lid 106 when the lid 106 is mounted in the second orientation to push, pull, and/or turn the shipping container 100.

Figure 5:
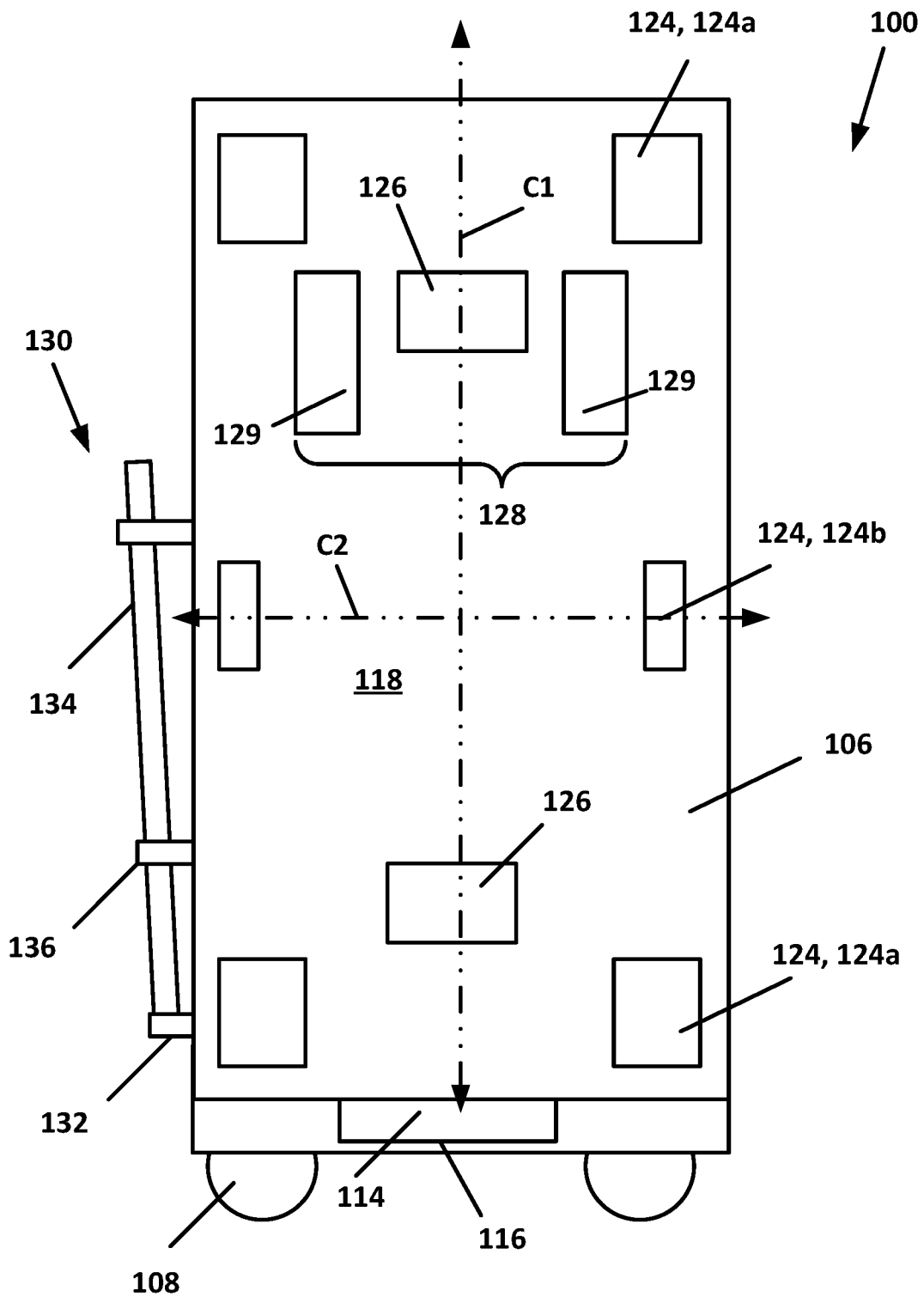
FIG. 5 is a first end elevational view of the shipping container of FIG. 4.
Figure 6:
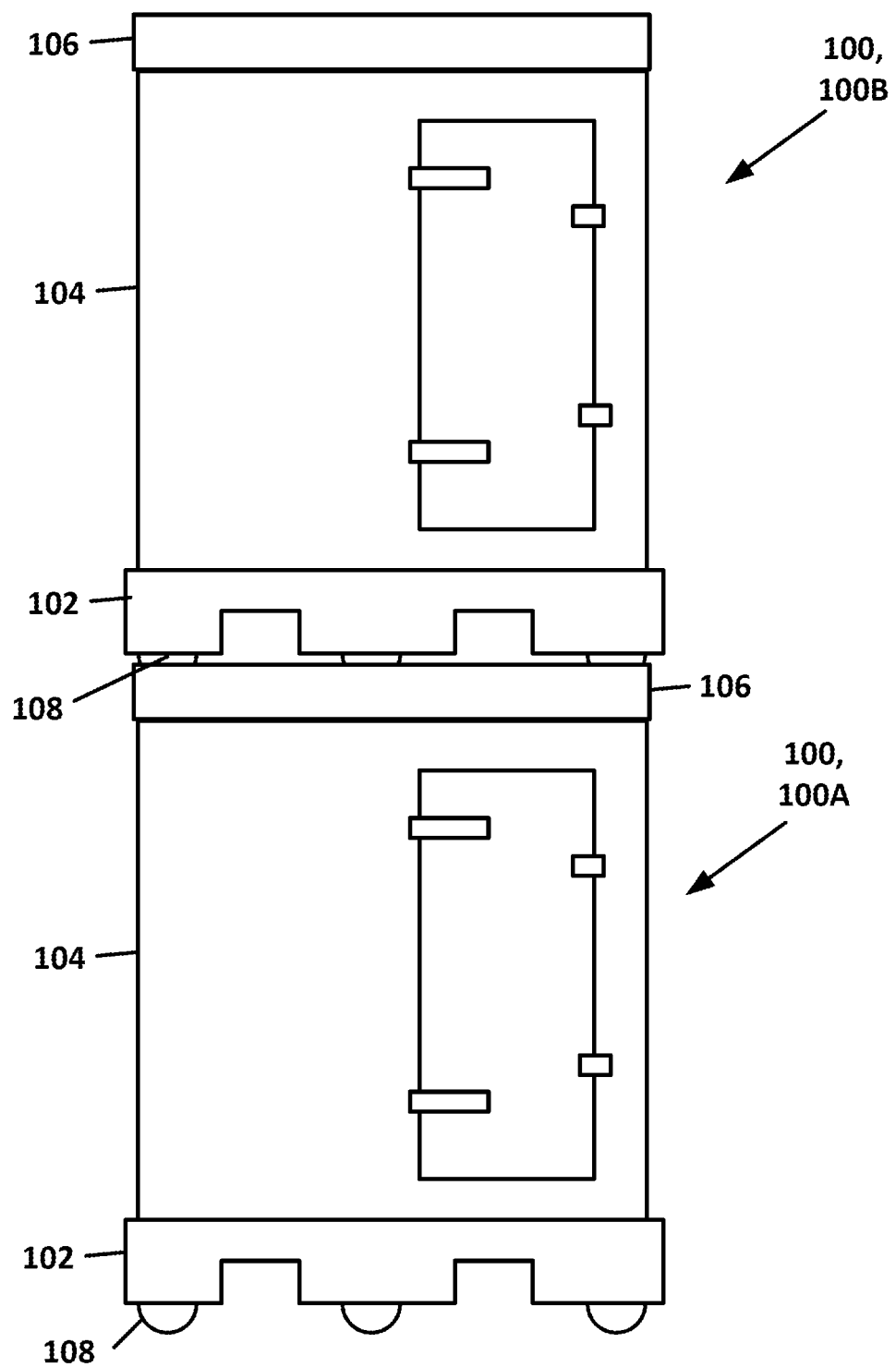
FIG. 6 shows a stack of two shipping containers configured in accordance with the shipping container of FIG. 1.

FIG. 5 shows the outer side 118 of the lid 106 when the lid 106 is mounted in the second orientation. The lid 106 includes handholds (e.g., handles) at the outer side 118 to facilitate manipulation of the lid 106. In certain implementations, the lid 106 includes a first pair of handholds 126 spaced apart from each other along the height H of the shipping container 100 when the lid 106 is disposed in the second orientation (and spaced apart along the width W when the lid 106 is disposed in the first orientation). The first handholds 126 facilitate mounting and removing the lid 106 in the first orientation. In certain implementations, the first handholds 126 are disposed along a first central axis C1, which extends along the height H of the shipping container 100 when the lid 106 is disposed in the second orientation (along the width W when the lid 106 is disposed in the first orientation).

In certain implementations, the lid 106 also includes a second handhold arrangement 128 that facilitates grasping the lid 106 while the lid 106 is disposed in the second orientation. In certain implementations, the second handhold arrangement 128 includes two handholds 129 spaced on opposite sides of the first central axis C1. In certain examples, the second pair of handholds 129 are offset from a second central lateral axis C2 extending along the depth D of the shipping container 100. Offsetting the second pair of handholds 129 enhances access to the second pair of handholds 129 while the lid 106 is disposed in the second orientation. Offsetting the second pair of handholds 129 also positions the handhold arrangement 128 at an ergonomically comfortable position to push, pull, and/or turn the shipping container 100.

In certain implementations, the outer side 118 of the lid 106 defines depressions 124 positioned to align with the caster wheels 108 of the base 102 when the lid 106 is mounted in the first orientation. Accordingly, a second shipping container 100B can be stacked onto a first shipping container 100A by seating the caster wheels 108 of the second shipping container 100B within the depressions 124 of the lid 106 of the first shipping container 100A when the lid 106 is mounted in the first orientation. In certain examples, the depressions 124 include larger depressions 124a disposed in alignment with the swivel caster wheels 108 and smaller depressions 124b disposed in alignment with the stationary caster wheels 108. The larger depressions 124a are sized and shaped to receive a swivel caster wheel 108 regardless of the rotational position of the caster wheel 108. In the example shown, the larger depressions 124a are disposed at the corners of the lid 106 and the smaller depressions 124b are disposed along the second central lateral axis C2.

Figure 7:
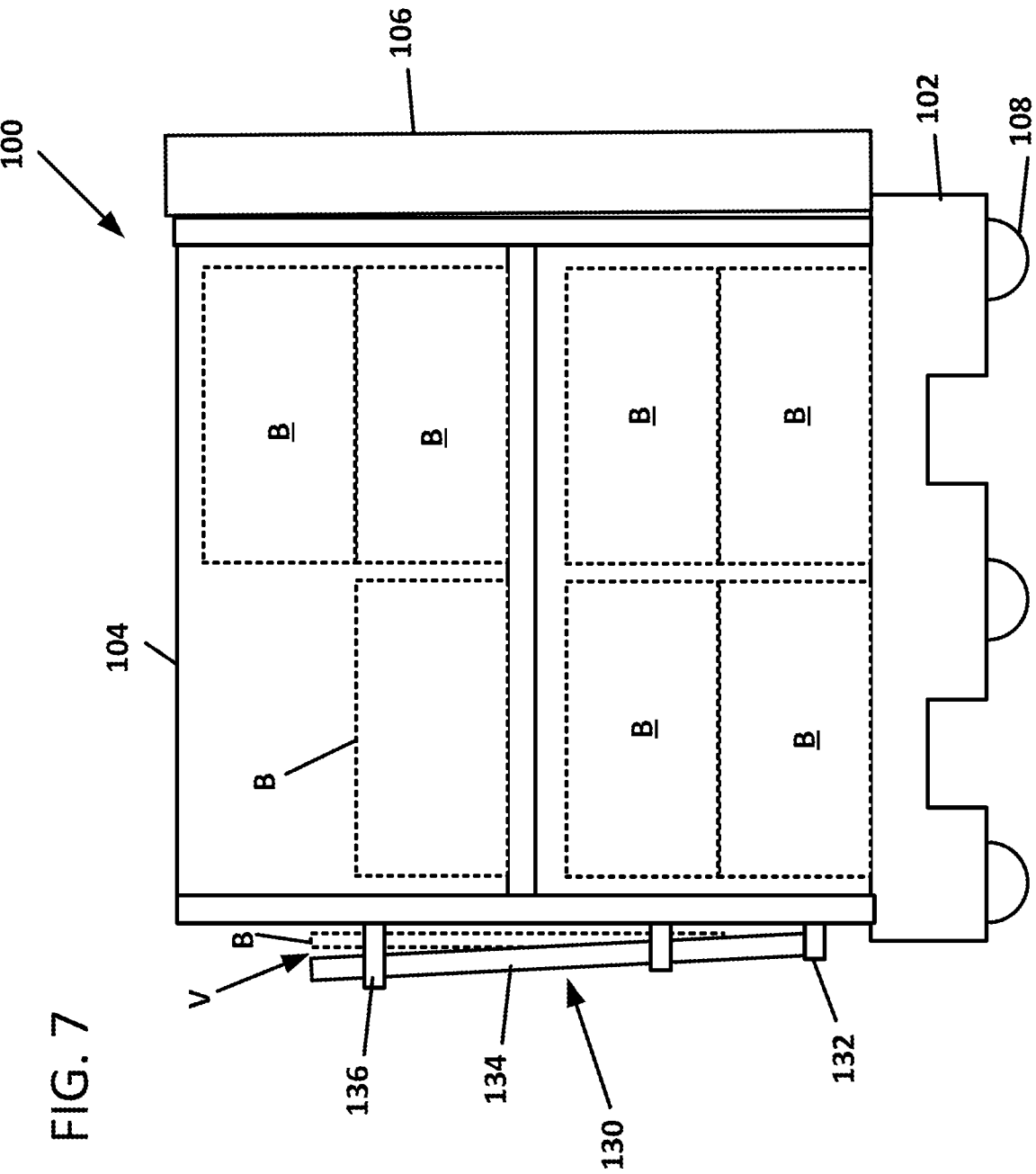
FIG. 7 shows the shipping container of FIG. 4 in an open configuration to reveal items stacked within the interior of the shipping container.
Figure 8:
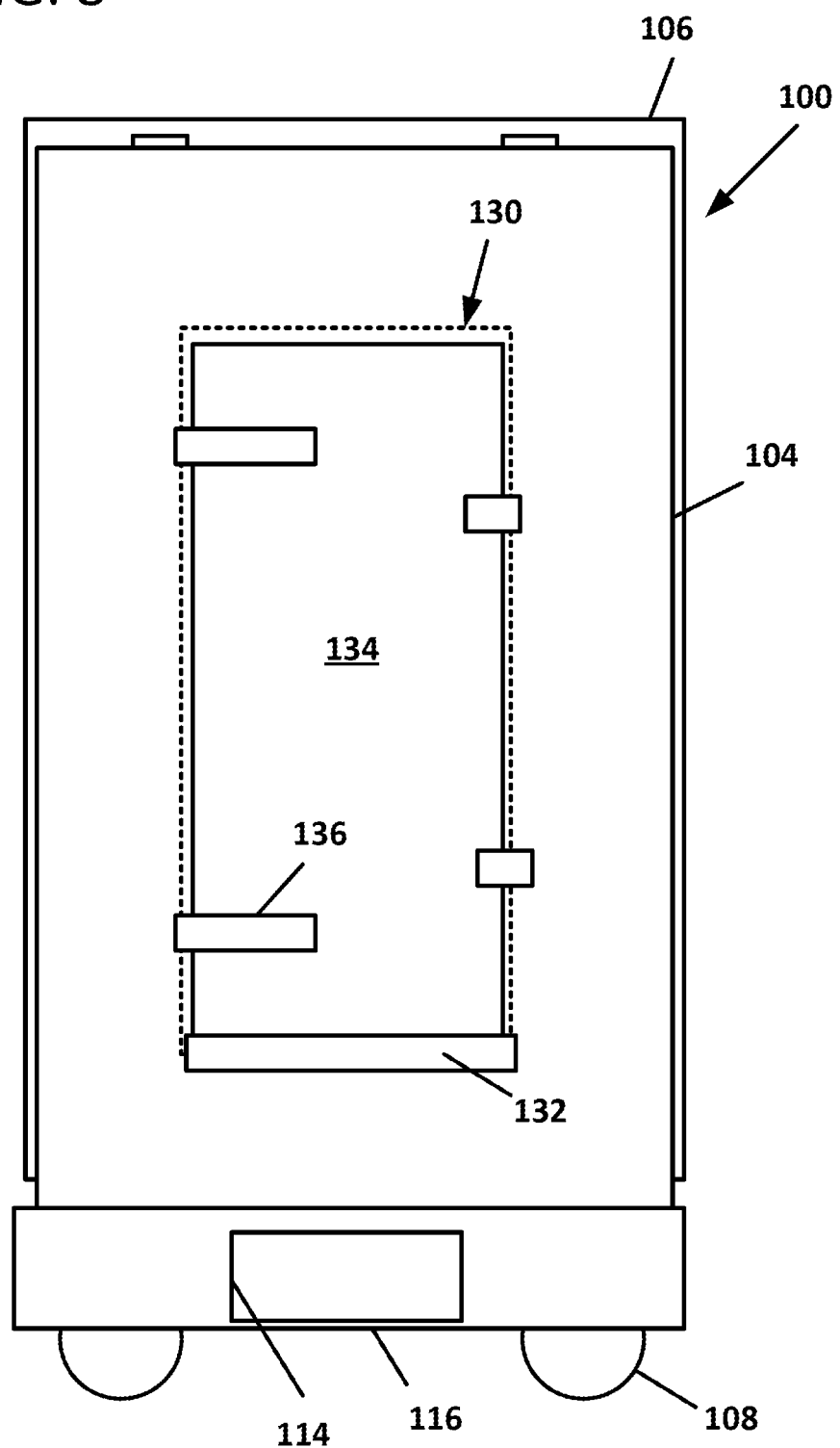
FIG. 8 is a second end elevational view of the shipping container of FIG. 4.

In certain implementations, one or more items can be packaged together (e.g., in boxes) and loaded within the interior of the shipping container 100 (e.g., see FIG. 7). In certain examples, the shipping container 100 includes a storage arrangement 130 that holds empty packaging (e.g., folded boxes) after the items are unloaded from the shipping container 100. In certain examples, the storage arrangement 130 is disposed at an exterior of the peripheral wall 104. In certain implementations, the storage arrangement 130 is disposed at an opposite side of the shipping container 100 from the lid 106 when the shipping container 100 is open and the lid 106 is disposed in the second orientation.

In certain implementations, the storage arrangement 130 includes a platform 132 extending outwardly from a peripheral wall 104 and a retaining wall 134 extending upwardly from the platform 132. The retaining wall 134 may be movably coupled to the platform 132 (e.g., through a living hinge or by seating behind a retaining lip of the platform 132, etc.). Straps 136 (e.g., hook and loop straps) extend outwardly from the peripheral wall 134 to secure the retaining wall 134 to the peripheral wall 104. For example, a first hook-and-loop strap 136 may have opposite ends attached to the retaining wall 134 and an intermediate portion routed through the peripheral wall 104 and along an interior of the peripheral wall 104. The retaining wall 134 is movable relative to the peripheral wall 104 to enlarge or contract a storage volume V therebetween.

In use, the shipping container 100 can be used at a distribution center, a warehouse, a factory, and at a retail store without modification to the shipping container 100. Items are loaded onto the shipping container 100 at the factory, warehouse, or distribution center. The shipping container 100 can be loaded (e.g., by rolling the shipping container using the caster wheels 108 or by lifting the shipping container using a forklift) onto a transport vehicle (e.g., a truck). The shipping container 100 can be stacked to facilitate filling available space within the transport vehicle.

The transport vehicle brings the shipping container 100 to a retail establishment (e.g., a store). The transport vehicle is unloaded from the transport vehicle (e.g., via the caster wheels 108 and/or a forklift). The shipping container 100 is then moved (e.g., via the caster wheels 108) into the retail establishment. In certain examples, the shipping container 100 is moved out onto the sales floor and maneuvered through aisles. In certain implementations, the lid 106 can be moved from the first orientation to the second orientation to assist in moving the shipping container 100 on the sales floor. At the appropriate shelves or display location, the items can be unloaded from the shipping container 100. In certain examples, packaging for the items can be removed and stored in the storage arrangement 130.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A shipping container having a width, a depth that is transverse to the width, and a height that is transverse to the width and to the depth, the height being larger than the width, wherein the width is larger than the depth, the shipping container comprising:
   a base defining a pair of channels extending along the depth of the shipping container and defining a cross-channel extending along the width of the shipping container, the pair of channels each extending between open ends and each defining an open bottom, the cross-channel intersecting the pair of channels, the cross-channel extending between respective open ends and having a respective open bottom;
   a framework disposed along the cross-channel to surround at least part of the cross-channel including extending across at least part of the open bottom of the cross-channel;
   a peripheral wall mountable to the base to extend upwardly along the height of the shipping container, the peripheral wall cooperating with the base to define an interior; and
   a lid mountable to the peripheral wall to close the interior.

2. The shipping container of claim 1, wherein the framework extends across the open bottom of the cross-channel at spaced intervals along the cross-channel.

3. The shipping container of claim 1, wherein the cross-channel is wider than each channel of the pair of channels.

4. The shipping container of claim 1, further comprising a plurality of caster wheels mounted to the base.

5. The shipping container of claim 4, wherein the plurality of caster wheels includes swiveling caster wheels at corners of the base and a pair of stationary caster wheels at a central region along the width of the shipping container, the pair of stationary caster wheels being disposed at opposite sides of the cross-channel.

6. The shipping container of claim 4, wherein the lid defines depressions that align with the caster wheels of the base.

7. The shipping container of claim 6, wherein the shipping container is a first shipping container; and further comprising a second shipping container identical to the first shipping container, the second shipping container being stacked on the first shipping container so that the caster wheels of the second shipping container seat in the depressions defined in the lid of the first shipping container.

8. The shipping container of claim 1, wherein the lid is configured to mount to the peripheral wall in a first orientation to close the interior and is configured to mount to the peripheral wall in a second orientation to provide steering control for the shipping container.

9. The shipping container of claim 8, wherein the lid includes a first attachment member that secures to the peripheral wall and a second attachment member that secures to the base.

10. The shipping container of claim 8, wherein the lid defines a first pair of handles spaced along the width of the shipping container and a second pair of handles spaced along the depth of the shipping container, wherein the first pair of handles are disposed along a first central lateral axis extending along the width of the shipping container; and wherein the second pair of handles are offset from a second central lateral axis extending along the depth of the shipping container.

11. The shipping container of claim 1, further comprising a storage arrangement disposed at an exterior of the peripheral wall, the storage arrangement including a platform extending outwardly from the peripheral wall, a retaining wall extending upwardly from the platform; and straps to secure the retaining wall to the peripheral wall, the retaining wall being movable relative to the peripheral wall to enlarge or contract a storage volume therebetween.

12. The shipping container of claim 11, wherein the retaining wall is pivotally or bendably secured to the platform.

13. The shipping container of claim 11, wherein the retaining wall is a separate piece from the platform and is configured to seat on the platform.

14. The shipping container of claim 11, wherein the straps include hook-and-loop straps.

15. The shipping container of claim 11, wherein the storage arrangement is disposed on a door or foldable portion of the peripheral wall so that the storage arrangement extends along the depth and height of the shipping container when the shipping container is opened.

16. A shipping container having a width, a depth that is transverse to the width, and a height that is transverse to the width and to the depth, the height being larger than the width, wherein the width is larger than the depth, the shipping container comprising:
 a base including a plurality of caster wheels;
 a peripheral wall mountable to the base to extend upwardly along the height of the shipping container, the peripheral wall cooperating with the base to define an interior; and
 a lid selectively mountable to the peripheral wall in a first orientation to close the interior and in a second orientation providing access to the interior, the lid having a first side and an opposite second side, the first side carrying a plurality of attachment members and the second side carrying at least one handhold, the attachment members being configured to secure the lid to the peripheral wall and the base when the lid is disposed in the second orientation, the attachment members not securing to either the peripheral wall or the base when the lid is disposed in the first orientation.

17. The shipping container of claim 16, wherein the at least one handhold includes a plurality of handholds disposed at opposite sides of a first central lateral axis and offset from a second central lateral axis that is transverse to the first central lateral axis.

18. The shipping container of claim 16, wherein the lid defines depressions that align with the caster wheels of the base.

19. The shipping container of claim 18, wherein the shipping container is a first shipping container; and further comprising a second shipping container identical to the first shipping container, the second shipping container being stacked on the first shipping container so that the caster wheels of the second shipping container seat in the depressions defined in the lid of the first shipping container.

20. The shipping container of claim 16, further comprising a storage arrangement disposed at an exterior of the peripheral wall, the storage arrangement including a platform extending outwardly from a-the peripheral wall, a retaining wall extending upwardly from the platform; and straps to secure the retaining wall to the peripheral wall, the retaining wall being movable relative to the peripheral wall to enlarge or contract a storage volume therebetween.

* * * * *